United States Patent
Park et al.

(10) Patent No.: US 9,304,553 B2
(45) Date of Patent: Apr. 5, 2016

(54) CONVERTIBLE COMPUTING APPARATUS

(71) Applicant: Samsung Electronics Co., Ltd, Suwon-si, Gyeonggi-do (KR)

(72) Inventors: Young-sun Park, Yongin-si (KR); Bo-won Jung, Gunpo-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 112 days.

(21) Appl. No.: 14/187,648

(22) Filed: Feb. 24, 2014

(65) Prior Publication Data

US 2014/0321038 A1    Oct. 30, 2014

(30) Foreign Application Priority Data

Apr. 29, 2013   (KR) .................. 10-2013-0047664

(51) Int. Cl.
*G06F 1/16*   (2006.01)

(52) U.S. Cl.
CPC .............. *G06F 1/1681* (2013.01); *G06F 1/162* (2013.01); *G06F 1/1643* (2013.01)

(58) Field of Classification Search
CPC combination set(s) only.
See application file for complete search history.

(56) References Cited

U.S. PATENT DOCUMENTS

| | | | |
|---|---|---|---|
| 6,275,376 B1 * | 8/2001 | Moon | 361/679.06 |
| 6,430,038 B1 * | 8/2002 | Helot et al. | 361/679.05 |
| 6,867,961 B2 * | 3/2005 | Choi | 361/679.06 |
| 6,903,927 B2 * | 6/2005 | Anlauff | 361/679.28 |
| 6,980,423 B2 * | 12/2005 | Tanaka et al. | 361/679.06 |
| RE39,429 E * | 12/2006 | Hawkins et al. | 708/100 |
| 7,203,058 B2 * | 4/2007 | Hong | 361/679.06 |
| 7,239,505 B2 * | 7/2007 | Keely et al. | 361/679.09 |
| 7,277,275 B2 * | 10/2007 | Won et al. | 361/679.27 |
| 7,283,355 B2 * | 10/2007 | Han | 361/679.55 |
| 7,551,426 B2 * | 6/2009 | Huang et al. | 361/679.02 |
| 7,652,873 B2 * | 1/2010 | Lee | 361/679.06 |
| 8,254,103 B2 | 8/2012 | Park et al. | |
| 8,908,364 B2 * | 12/2014 | Tseng et al. | 361/679.26 |
| 9,069,528 B2 * | 6/2015 | Hsu et al. | |
| 2008/0174943 A1 * | 7/2008 | Hirasawa et al. | 361/681 |
| 2012/0229962 A1 | 9/2012 | Chen et al. | |
| 2013/0214661 A1 * | 8/2013 | McBroom | 312/325 |

FOREIGN PATENT DOCUMENTS

| | | |
|---|---|---|
| KR | 10-2006-0052102 | 5/2006 |
| KR | 10-2011-0039870 | 4/2011 |
| KR | 10-2012-0127793 | 11/2012 |
| WO | 2012-157873 | 11/2012 |

* cited by examiner

*Primary Examiner* — Lisa Lea Edmonds
(74) *Attorney, Agent, or Firm* — Staas & Halsey LLP

(57) ABSTRACT

A computing apparatus includes a first body having a keyboard, a second body having a display, and a support of which one end portion is connected to the first body through at least one first hinge unit and the other end portion is connected to the second body through at least one second hinge unit disposed in parallel to the first hinge unit. The first hinge unit is disposed to be spaced away from a rear end portion of the first body so that when the second body and the support are simultaneously rotated in a direction in which the second body and the support are spaced away from the first body, a rear end portion of the second body interferes with the rear end portion of the first body and the second body is rotated in a direction in which the second body is spaced away from the support.

18 Claims, 15 Drawing Sheets

CONVERTIBLE COMPUTING APPARATUS

CROSS-REFERENCE TO RELATED APPLICATIONS

This application claims priority under 35 U.S.C. §119(a) from Korean Patent Application No. 10-2013-0047664, filed on Apr. 29, 2013, in the Korean Intellectual Property Office, the disclosure of which is incorporated herein by reference in its entirety.

BACKGROUND OF THE INVENTION

1. Field of the Invention

Apparatuses and methods consistent with exemplary embodiments of the present general inventive concept relate to a convertible computing apparatus, and more particularly, to a convertible computing apparatus capable of variously switching usage modes.

2. Description of the Related Art

Recently, various mobile apparatuses have been released. A tablet personal computer (PC), among the mobile apparatuses, is an apparatus having a single body, having a touch screen on one surface thereof, and including a computable controller.

In the tablet PC, a virtual keyboard is displayed on the touch screen to input a signal. It is difficult to use the virtual keyboard as compared with existing physical keyboards, due to touch errors and the like. Convertible PCs, to which a separate physical keyboard is added to supplement a tablet PC, and which may use the separate physical keyboard according to a usage mode, have been released.

The convertible PCs in the related art may selectively be set to a mode which uses the function of a tablet PC while in a state in which the tablet PC covers the physical keyboard, and a mode which allows the user to input a signal to the tablet PCs using the physical keyboard by turning the tablet PC toward the physical keyboard.

However, in convertible PCs, since one side of the tablet PC is fixed to a plate to which the physical keyboard is provided, the use through adjustment of various angles is limited.

SUMMARY OF THE INVENTION

Exemplary embodiments of the present general inventive concept provide a convertible computing apparatus capable of freely setting a usage angle of a second body by eliminating a portion in which the second body having a tablet PC function is directly connected to a first body having a keyboard, and steadily maintaining a posture by minimizing movement of the second body when setting the second body to various angles.

Additional features and utilities of the present general inventive concept will be set forth in part in the description which follows and, in part, will be obvious from the description, or may be learned by practice of the general inventive concept.

Exemplary embodiments of the present general inventive concept provide a computing apparatus. The computing apparatus may include: a first body having a keyboard, a second body having a display, and a support having a first and second end portion, the first end portion being connected to the first body through at least one first hinge unit and the second end portion being connected to the second body through at least one second hinge unit disposed in parallel to the first hinge unit, the first hinge unit being disposed to be spaced away from a rear end portion of the first body so that when the second body and the support are simultaneously rotated in a direction in which the second body and the support are spaced away from the first body, a portion of the second body interferes with a rear end portion of the second body and the second body is rotated in a direction in which the second body is spaced away from the support.

The first hinge unit may lock and unlock the support with respect to the first body, and the second hinge unit may lock and unlock the second body with respect to the support.

The first hinge unit may include a first hinge shaft, a first cam member rotatably coupled to the first hinge shaft, and a second cam member fixedly coupled to the first hinge shaft in a state of contacting, pressing, and supporting the first cam member.

The first hinge unit may include a first elastic member configured to press the second cam member toward the first cam member so that the first cam member maintains a locking position with respect to the second cam member.

The first cam member may include a first cam projection, and the second cam member may include a second cam projection facing the first projection. When the first cam projection crosses a front end of the second cam projection in the locking position, the first cam projection may be switched to an unlocking position.

The first hinge may include a second elastic member configured to elastically support the first cam member to rotate the first cam member in an unlocking direction when the first cam projection is switched to the unlocking position.

The second elastic member may include a torsion spring.

The second hinge may include a second hinge shaft, a third cam member rotatably coupled to the second hinge shaft, and a fourth cam member fixedly coupled to the second hinge shaft and in a state of contacting, pressing, and supporting the third cam member.

The second hinge may further include a third elastic member configured to press the fourth cam member toward the third cam member so that the third cam member maintains a locking position with respect to the fourth cam member.

The third cam member may include a third cam projection, and the fourth cam member may include a fourth cam projection facing the third projection. When the third cam projection crosses a front end of the fourth cam projection in the locking position, the third cam projection may be switched to an unlocking position.

The second hinge may further include a fourth elastic member configured to elastically support the third cam member to rotate the third cam member in an unlocking direction when the third cam projection is switched to the unlocking position.

The fourth cam member may include a cam inclined plane configured to allow a front end of the third cam member to be guided while the support is spaced away from the first body to turn to a preset angle, and a cam extended plane configured to extend from the cam inclined surface and allow the front end of the third cam member to be selectively located.

Elastic force of the third elastic member may be greater than that of the fourth elastic member so that a location of the front end of the third cam member is maintained at any point of the cam extended plane of the fourth cam member.

The fourth elastic member may include a torsion spring.

The second body and the support may be selectively set to any one usage mode among a first usage mode in which the second body and the support are parallel to the first body, a second usage mode in which the support is rotated from the first body to be maintained at a preset angle to the first body, and the second body is rotated from the support to be maintained at a preset angle parallel to the first body, and a third mode in which the support may be rotated from the first body to be maintained at a preset angle to the first body, and the second body is rotated on the basis of the second hinge and maintained to be inclined toward the keyboard of the first body.

The second body and the support may be selectively set to a fourth usage mode, in which the support is rotated from the first body to be maintained at a preset angle to the first body, and the second body is rotated on the basis of the second hinge, and maintained to be inclined toward a side of the first body opposite to a side of the first body in which the keyboard of the first body is located.

In the fourth usage mode, at least one first magnet may be disposed in a rear end portion of the first body, and a second magnet configured to be attracted to the first magnet may be disposed in a rear end portion of the second body adjacent to the rear end portion of the first body.

In the first usage mode, the second body may be disposed in a location in which a periphery of the rear end portion of the second body is disposed at an inner side of the first body from a periphery of the rear end portion of the first body.

Opposing sides of the support may be respectively supported by a first support rod and a second support rod, and one end of each of the first and second support rods may be hinge-connected to the support and the other end of thereof may be slidably connected to the first body.

The support may further include first and second guide members configured to allow the first and second support rods to be inserted and withdrawn thereto. A guide rail configured to allow the other end of each of the first and second support rods to be slidably guided along the first and second guide members may be formed in each of the first and second guide members.

Exemplary embodiments of the present general inventive concept also provide a computer apparatus including a first body, a second body having a display, and a support connecting the first body and the second body, the support configured to maintain the first body and the second body in any one of a plurality of usage modes, each of the plurality of usage modes being defined by an orientation and a location of the second body relative to the first body, the support including a first support element connected to a first portion of the first body and a first portion of the second body, and a second support element connected to the first support element and a second portion of the first body different from the first portion of the first body.

The second support element may include a support rod, a first end of the support rod being connected to the first support element and a second end of the support rod being connected to the second portion of the first body.

The first support element may include a front edge and a rear edge disposed opposite the front edge. The first end of the support rod may be connected to the first support element between the front edge of the first support element and the rear edge of the first support element.

The first body may include a front edge and a rear edge disposed opposite the front edge. The second portion of the first body may be disposed between the front edge of the first body and the rear edge of the first body. The second end of the support rod may be slidably connected to the second portion of the first body. The second end of the support rod may slidably move in the second portion of the first body according to the usage mode.

The plurality of usage modes may include a first usage mode in which the second body and the first body are substantially parallel to each other and the second body is disposed at a surface of the first body, a second usage mode in which the second body and the first body are substantially parallel to each other and separated from each other by the support, and a third usage mode in which the second body is disposed at a preset angle to the first body by the support, such that an edge portion of the second body contacts the first body.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
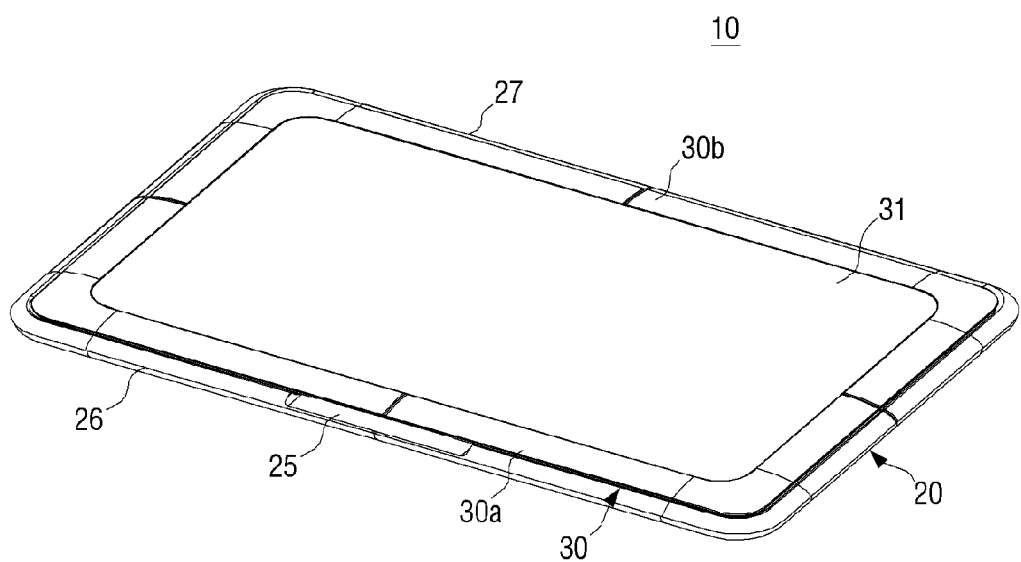
FIG. 1 is a perspective view illustrating a first usage mode of a convertible computing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the following description, such as detailed construction and elements, are provided to assist in a comprehensive understanding of the exemplary embodiments of the present general inventive concept. Thus, it is apparent that the exemplary embodiments can be carried out without those specifically defined matters. Also, functions or elements known in the related art are not described in detail since they would obscure the exemplary embodiments with unnecessary detail.

A convertible computing apparatus 10 according to an exemplary embodiment of the present general inventive concept may selectively switch a usage mode to any of a first mode to a fourth mode. Each of the first to fourth usage modes will be defined later.

Referring to FIG. 1, in the first usage mode, a second body 30 and a support 40 (illustrated in FIG. 2) are folded on a first body 20. At this time, the support 40 is housed in a receiving groove 23 (illustrated in FIG. 2) of the first body 20, and the second body 30 covers the support 40 and a keyboard 21 (illustrated in FIG. 2) of the first body 20. An end portion 30a and an other end portion 30b of the second body 30 may be disposed inside of a periphery 26 of the first body 20. The other end portion 30b may also be referred to as a rear end portion of the second body 30. For the purposes of this description, "rear portion" may denote a portion of the first body 20 or second body 30 disposed furthest from the keyboard 21.

In the first usage mode, all the first body 20, the second body 30, and the support 40 are kept parallel to one another. In the first usage mode, the user may use a tablet PC function provided in the second body 30.

Figure 2:
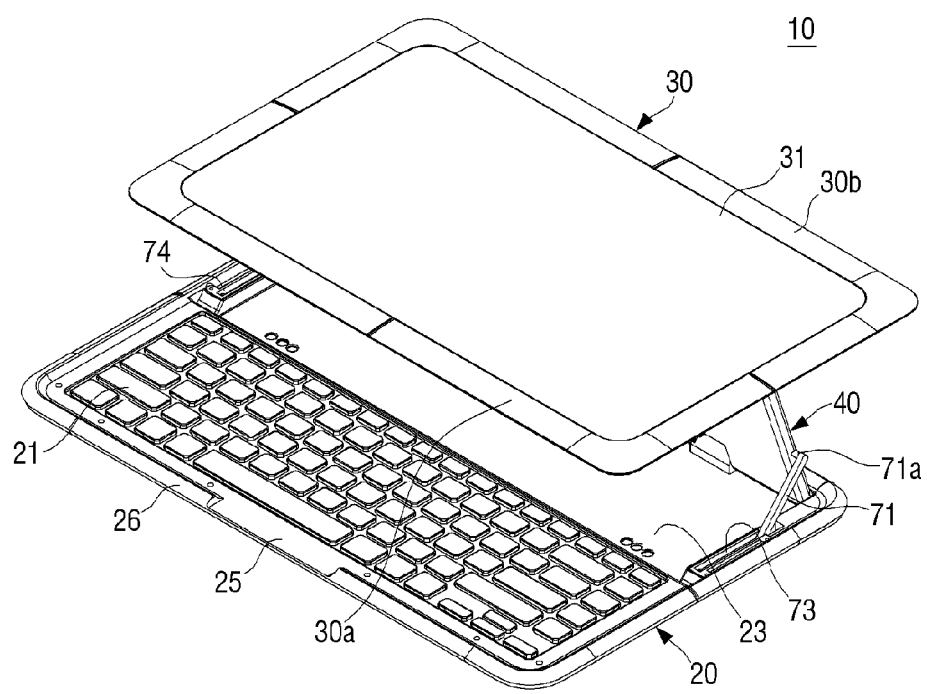
FIG. 2 is a perspective view illustrating a second usage mode of a convertible computing apparatus according to an exemplary embodiment of the present general inventive concept.

Referring to FIG. 2, in the second usage mode, the support 40 is rotated to a predetermined angle to be spaced away from the first body 20, and the second body 30 also rotates to a predetermined angle with respect to the support 40 to be spaced away from the support 40. In the second usage mode, since the keyboard 21 is exposed, the user may use the keyboard 21 provided in the first body 20 as well as the tablet PC function of the second body 30.

Figure 3:
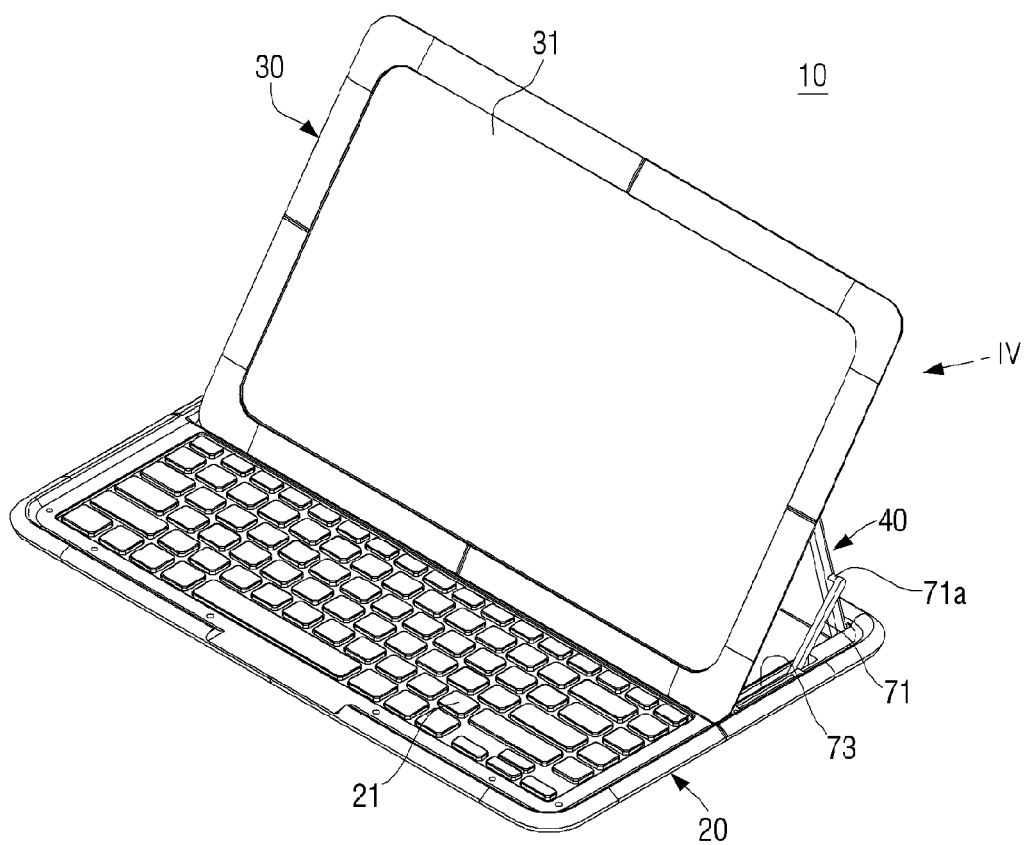
FIG. 3 is a perspective view illustrating a third usage mode of a convertible computing apparatus according to an exemplary embodiment of the present general inventive concept.

Referring to FIG. 3, in the third usage mode, the second body 30 is turned to a predetermined angle toward the keyboard 21 from the posture of the second usage mode. At this time, the end portion 30a of the second body 30 may be placed in a portion of a receiving groove 23 which is in contact with one side of the keyboard 21.

Figure 7:
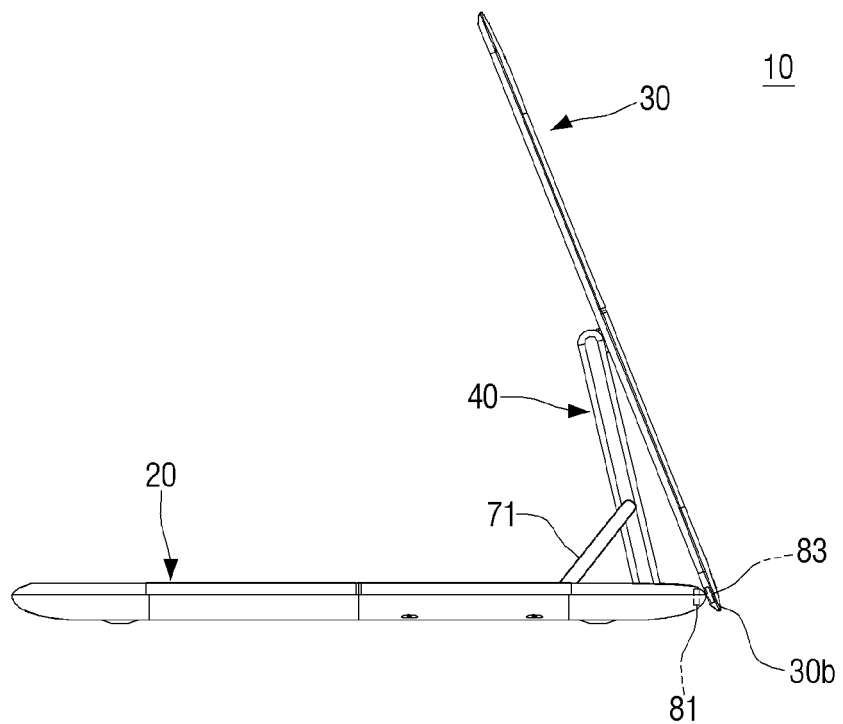
FIG. 7 is a perspective view illustrating a fourth usage mode of a convertible computing apparatus according to an exemplary embodiment of the present general inventive concept.

Referring to FIG. 7, in the fourth usage mode, the second body 30 is turned to a predetermined angle toward an opposite side of the keyboard 21, supported by the support 40, from the posture of the second usage mode. Therefore, not only the user located on a first side of the keyboard 21 but also another user located on a second side of the keyboard 21 opposite the first side of the keyboard 21 may use the tablet PC function of the second body 30.

Hereinafter, the convertible computing apparatus 10 according to an exemplary embodiment of the present general inventive concept will be described with reference to the accompanying drawings.

Referring to FIGS. 1 to 4, the convertible computing apparatus 10 according to an exemplary embodiment of the present general inventive concept may include the first body 20, the second body 30, the support 40, a pair of first hinge units 50a and 50b, a pair of second hinge units 60a and 60b, a pair of first and second support rods 71 and 72, and a plurality of first and second magnets 81 and 83.

Figure 6:
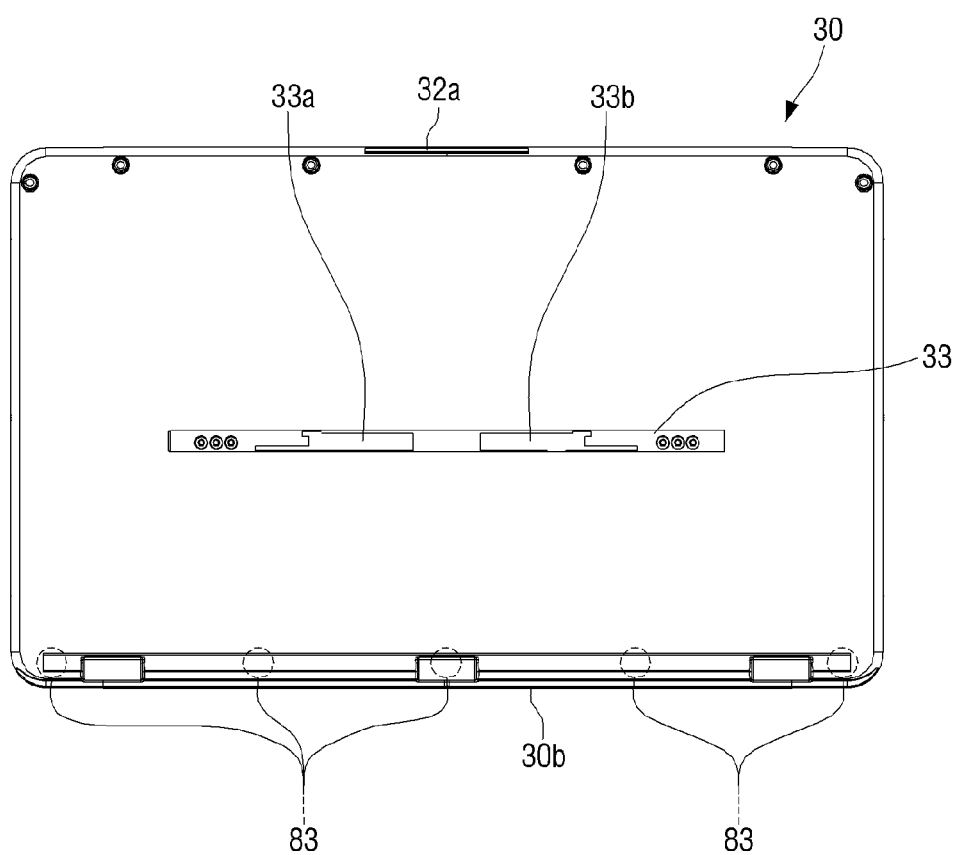
FIG. 6 is a bottom view illustrating a second body of a convertible computing apparatus according to an exemplary embodiment of the present general inventive concept.

The first body 20 is divided into a section in which the keyboard 21 is disposed, and a section including the receiving groove 23, into which the support 40 is inserted. The receiving groove 23 approximately corresponding to a size of the support 40 is formed in the section into which the support 40 is inserted. At this time, a concave groove 25 is formed in a front-end of the first body 20 so that the user may easily hold up one end portion 30a of the second body 30 with the user's fingers to separate the second body 30 from the first body 20. The second body 30 may include a contact area 32a (illustrated in FIG. 6) lining up with the groove 25, for the user's fingers to contact when separating the second body 30 from the first body 20. The contact area 32a may be textured to allow the user's fingers to easily grip the second body 30.

A wireless communication module (not illustrated) configured to perform wireless communication to input signals to the second body 30 through the keyboard 21 may be embedded in the first body 20. At this time, a wireless communication module (not illustrated) configured to perform pairing with the wireless signals of the wireless communication module embedded in the first body 20 may also be embedded in the second body 30. Various wireless communication standards such as Bluetooth may be applied between the wireless communication modules of the first and second bodies 20 and 30.

In addition, signals may be transmitted and received between the first body 20 and the second body 30 without wireless communication, for example through a predetermined signal cable (not illustrated) connecting the first body 20 and the second body 30 via the support 40. Signals may be transmitted and received between the first body 20 and the second body 30 in a wired manner by installing flexible printed circuit boards (PCBs) (not illustrated) in portions of the first and second bodies 20 and 30 which are hinge-connected to the support 40 and electrically connecting the flexible PCBs to the signal cable.

The first body 20 is hinge-connected to the support 40 so that one end portion 40a (illustrated in FIG. 5) of the support 40 may turn to a location in which the support 40 is spaced toward the inside of the first body 20 from a rear end portion 27 of the first body 20. The mutual hinge connection point between the first body 20 and the support 40 is set to a point spaced away from the rear end portion 27 of the first body 20. This is to cause the second body 30 to rotate in a B direction (illustrated in FIG. 12) with respect to the support 40 in connection with the operation of rotating the second body 30 and the support 40 in an A direction (illustrated in FIG. 12). The operation will be described in detail below.

The connection between the first body 20 and the support 40 may be made through the pair of first hinge units 50a and 50b. At this time, a first connection bracket 52 (illustrated in FIG. 5) in each of the pair of first hinge units 50a and 50b is fixed to the first body 20 through a fastener (not illustrated).

In the present exemplary embodiment of the present general inventive concept, it has been described that the first hinge units 50a and 50b are configured as one pair, but the first hinge unit is not limited thereto, and one first hinge unit or three or more first hinge units may be installed according to sizes and configurations of the first body 20 and the support 40.

The second body 30 may be a mobile apparatus (for example, a tablet PC) configured to execute a program using a touch screen as a main input method without a physical keyboard. The second body 30 may include a display 31 configured to receive a touch input, and a controller (not illustrated) configured to receive a signal through the display 31 and execute a predetermined program. The controller may include a predetermined memory (not illustrated) configured to store and access a program. A speaker (not illustrated) configured to reproduce and output a sound source according to driving of the program, a microphone (not illustrated) configured to input a sound signal from the outside, a camera module (not illustrated) configured to image an image, and a wireless communication module (not illustrated) configured to perform wireless communication may also be embedded in the controller.

The second body 30 may be formed in an area substantially smaller than that of the first body 20. As illustrated in FIG. 1, in the first usage mode in which the second body 30 is folded on the first body 20, a location of the second body 30 may be set so that the second body 30 is not deviated from the periphery 26 of the first body 20. That is, the second body 30 lines up with and covers the first body 20.

Approximately a central portion of a rear surface of the second body 30 may be hinge-connected to the other end portion 40b (illustrated in FIG. 5) of the support 40. At this time, a hinge housing 33 configured to house the pair of second hinge units 60a and 60b is formed in the central portion of the second body 30. Receiving areas 33a and 33b of the hinge housing 33 respectively receive and hold the second hinge units 60a and 60b. Further, a first connection bracket 62 (illustrated in FIG. 5) of each of the pair of second hinge units 60a and 60b is fixed to the second body 30 through a fastener (not illustrated).

In the above-described exemplary embodiment of the present general inventive concept, it has been described that the second hinge units 60a and 60b is configured in one pair like the first hinge units 50a and 50b, but this is not limited thereto, and one second hinge unit or three or more second hinge units may be installed according to sizes and configurations of the second body 30 and the support 40.

The support 40 mutually hinge-connects the first body 20 and the second body 30. The support 40 is folded on the first body 20 in the usage mode (illustrated in FIG. 1) and is housed in the receiving groove 23 of the first body 20. Further, in the second to fourth usage modes (illustrated in FIGS. 2, 3, and 7), the support 40 supports the second body 30 in a state in which the support 40 rotates to a predetermined angle with respect to the first body 20.

Figure 5:
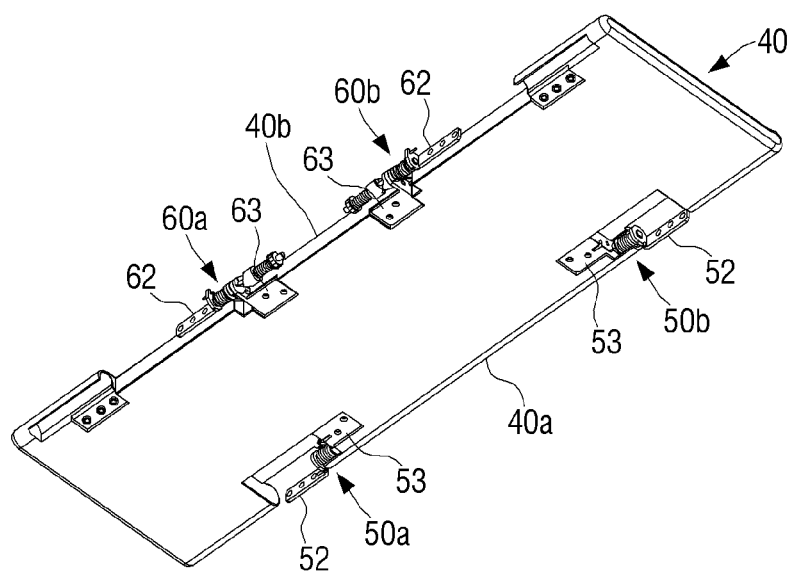
FIG. 5 is a perspective view illustrating a support of a convertible computing apparatus according to an exemplary embodiment of the present general inventive concept.

Referring to FIG. 5, the support 40 houses the pair of first hinge units 50a and 50b at intervals in one end portion 40a thereof. At this time, the second connection bracket 53 in each of the pair of first hinge units 50a and 50b is fixed to the support 40 through a fastener (not illustrated). Further, the second connection bracket 63 in each of the pair of second hinge units 60a and 60b is fixed to the other end portion 40b of the support 40 through a fastener (not illustrated).

In the exemplary embodiment of the present general inventive concept, it has been described that the support 40 merely functions to support the second body 30, but this is not limited thereto, and a controller (not illustrated) configured to perform a computing function such as a laptop PC or a tablet PC may be further provided in the support 40. When the controller is provided in the support 40, the controller may be electrically connected to the keyboard 21 of the first body 20 and the display 31 of the second body 30 through a general wired method (for example, signal and power cables, and the like). With a controller so disposed in the support 40, the second body 30 may omit the controller embedded therein and include only the display 31 to perform only a display function.

The pair of first hinge units 50a and 50b mutually hinge-connect the first body 20 and the support 40 through the first connection bracket 52 fixed to the first body 20 and the second connection bracket 53 fixed to the support 40. At this time, the pair of the first hinge units 50a and 50b are located on the same axis. The pair of second hinge units 60a and 60b mutually hinge-connect the second body 30 and the support 40 through the first connection bracket 62 fixed to the second body 30 and the second connection bracket 63 fixed to the support 40. At this time, the pair of the second hinge units 60a and 60b are located on the same axis. The pair of first hinge units 50a and 50b and the pair of second hinge units 60a and 60b are disposed in parallel to each other.

The pair of first hinge units 50a and 50b have the same configuration, the pair of second hinge units 60a and 60b have the same configuration other than the second cam member 67, and thus hereinafter only the first hinge unit 50a will be described. Further, the second cam member 67 of the pair of second hinge units 60a and 60b will be described when the second cam member 57 of the first hinge unit 50a is described.

Figure 8:
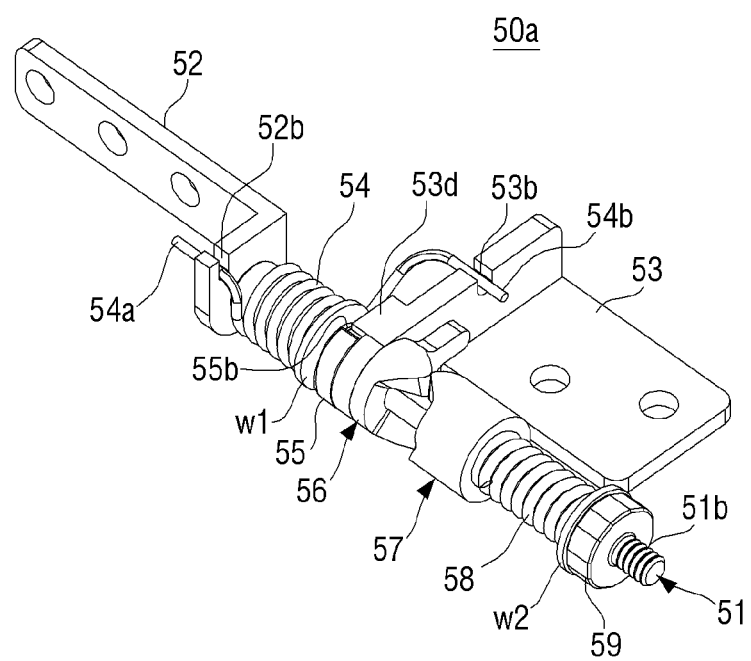
FIG. 8 is a coupled perspective view illustrating a first hinge unit of a convertible computing apparatus according to an exemplary embodiment of the present general inventive concept.
Figure 9:
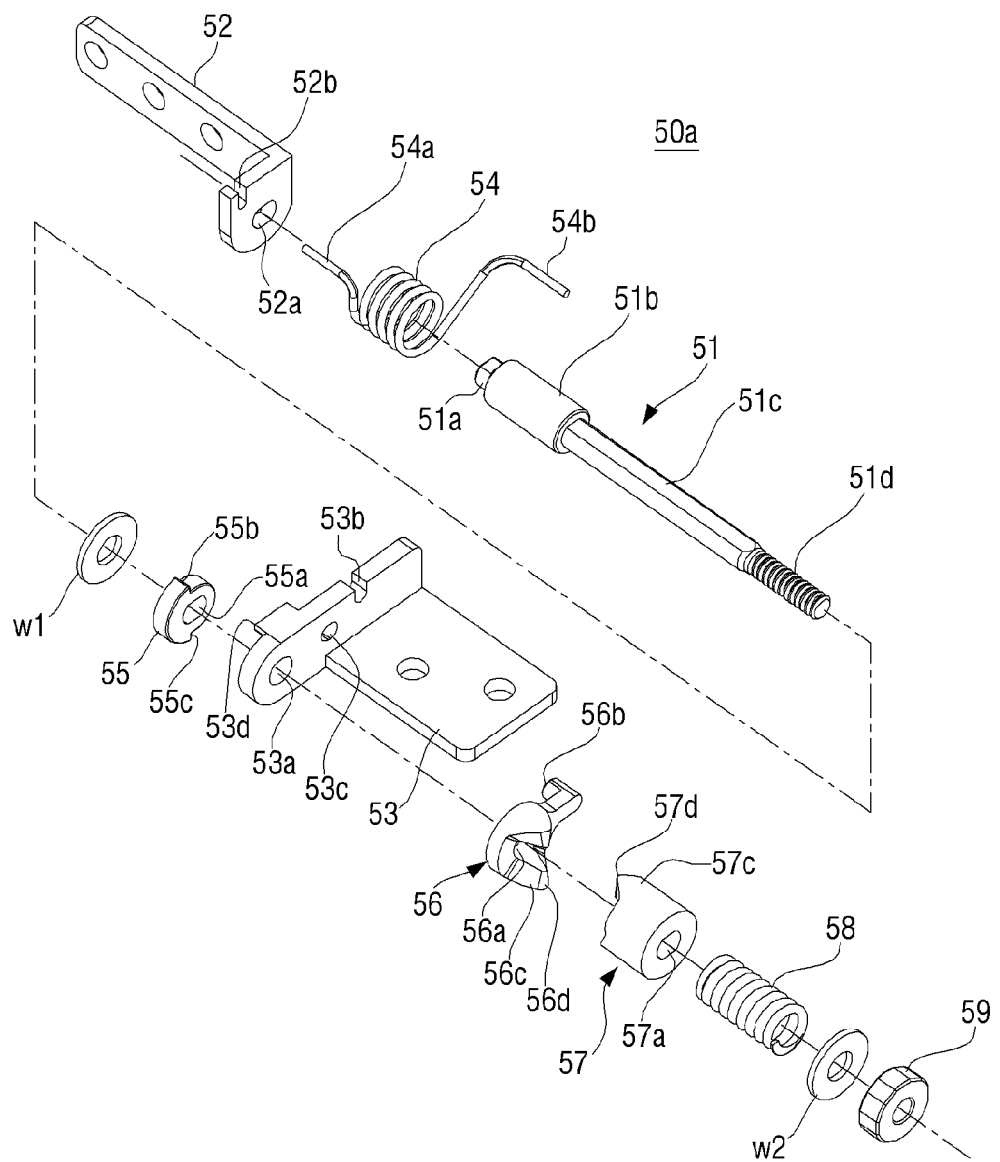
FIG. 9 is an exploded a perspective view illustrating the first hinge unit illustrated in FIG. 8.

Referring to FIGS. 8 and 9, the first hinge unit 50a includes a hinge shaft 51, the first connection bracket 52, the second connection bracket 53, a first elastic member 58, a stopper 55, a first cam member 56, the second cam member 57, a second elastic member 54, and an adjustment nut 59.

In the hinge shaft 51, a first fixing part 51a, a coupling part 51b, a second fixing part 51c, and a fastener 51d are sequentially formed along a length direction of the hinge shaft 51.

The first fixing part 51a is detachably fixed to a coupling hole 52a of the first connection bracket 52. A cross-section of the first fixing part 51a is in a state in which a circular upper portion and a circular lower portion thereof are cut substantially to be parallel to each other. That is, in the cross-section, symmetrical curves are formed in both sides, and straight lines are formed in the upper and lower portions. At this time, the coupling hole 52a of the first connection bracket 52 has a shape corresponding to the cross-section of the first fixing part 51a to prevent the first connection bracket 52 from rotating with respect to the hinge shaft 51.

The coupling part 51b extends from one side of the first fixing part 51a and has a cylindrical shape having a thickness thicker than the first fixing part 51a. The second elastic member 54 is detachably inserted on the coupling part 51b.

The second fixing part 51c has the same cross-sectional shape as the first fixing part 51a, and has a length larger than that of the first fixing part 51b. A first washer W1, the stopper 55, the second connection bracket 53, the first cam member 56, the second cam member 57, the first elastic member 58, and a second washer W2 are detachably coupled to the second fixing part 51c. At this time, coupling holes 55a and 57a into which the second fixing part 51c is inserted are formed in the stopper 55 and the second cam member 57 respectively. The coupling holes 55a and 57a are formed in a shape corresponding to the cross-section of the second fixing part 51c. Thus, the stopper 55 and the second cam member 57 are coupled to the hinge 51 so that the stopper 55 and the second cam member 57 are impossible to rotate with respect to the hinge shaft 51.

A thread is formed along a circumference of the fastener 51d, and the adjustment nut 59 is detachably fastened to the fastener 51d.

Hereinafter, the described components inserted into the hinge shaft 51 will be described.

One side portion of the first connection bracket 52 is fixed to the first body 20, and the coupling hole 52a to which the first fixing part 51a is coupled is formed in the other side portion thereof. Since the coupling hole 52a of the first connection bracket 52 is unrotatably coupled to the first fixing part 51a, the hinge shaft 51 is fixed to the first body 20 by the first connection bracket 52, so as not to rotate with respect to the first body 20. A first fixing groove 52b is formed in the other side portion of the first connection bracket 52. One end portion 54a of the second elastic member 54 is detachably coupled to the first fixing groove 52b.

One side portion of the second connection bracket 53 is fixed to the support 40, and the coupling hole 53a to which the second fixing part 51c is coupled is formed in the other side portion thereof. At this time, since the coupling hole 53a of the second connection bracket 53 has a circular shape, the coupling hole 53a is rotatably coupled to the second fixing part 51c. Therefore, when the support 40 rotates on the basis of the pair of first hinge units 50a and 50b, the second connection bracket 53 rotates together with the support 40. A second fixing groove 53b into which the other end portion 54b of the second elastic member 54 is detachably inserted is formed in the other end portion of the second connection bracket 53, and a fixing hole 53c to which a coupling projection 56b of the first cam member 56 is detachably coupled is formed in the other end portion of the second connection bracket 53.

The second elastic member 54 includes a torsion spring, one end portion 54a and the other end portion 54b of the second elastic member 54 are connected to different members, that is, the first connection bracket 52 fixed to the first body 20 and the second connection bracket 53 is fixed to the support 40, respectively. The second elastic member 54 has elastic force having a first magnitude in the first usage mode (illustrated in FIG. 1), and has elastic force having a second magnitude less than the first magnitude in the second usage mode to the fourth usage mode (illustrated in FIGS. 2, 3, and 7). Since the elastic force of the first magnitude is greater than the elastic force of the second magnitude, the elastic force of the second elastic member 54 acts in a direction in which the support 40 is spaced at a predetermined angle with respect to the first body 20.

The stopper 55 is unrotatably coupled to the coupling hole 55a with respect to the hinge shaft 51. Stumbling sills 55b and 55c configured to limit rotation of the second connection bracket 53 which rotates with respect to the hinge shaft 51 within a predetermined angle range are formed in a circumference of the stopper 55. At this time, stumbling projections 53d corresponding to the stumbling sills 55b and 55c are formed in upper and lower sides of the other end portion of the second connection bracket 53.

A circular coupling hole 56a which allows the first cam member 56 to rotate with respect to the hinge shaft 51 is formed in the first cam member 56. The coupling projection 56b is formed to extend to one side of the first cam member 56, and is coupled to the coupling hole 53c of the second connection bracket 53. Thus, when the second connection bracket 53 rotates with respect to the hinge shaft 51, the first cam member 56 rotates together with the second connection bracket 53.

Figure 10:
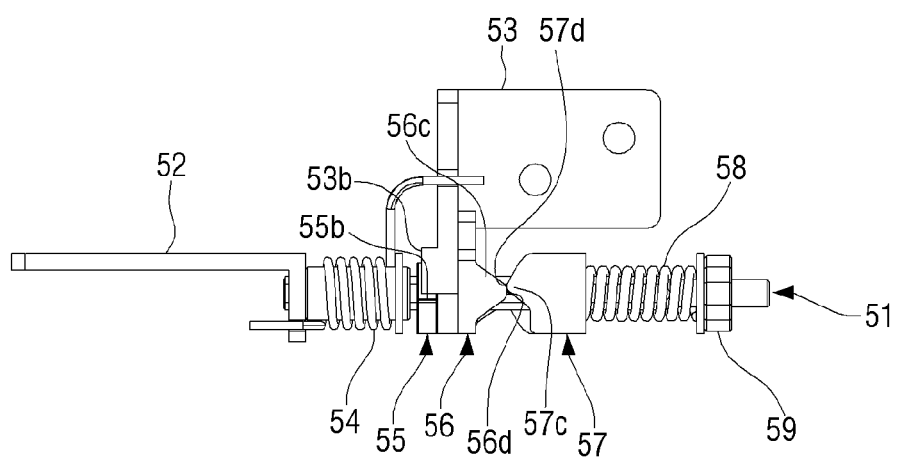
FIG. 10 is a view illustrating a locking state of a first hinge unit of a convertible computing apparatus according to an exemplary embodiment of the present general inventive concept.

The first cam projection 56c projecting toward a side facing the second cam member 57 is formed in the first cam member 56. A pair of first cam projections 56c may be symmetrically formed on the basis of the coupling hole 56a, and a cam curve is formed along a periphery of the first cam projection 56c. A front-end 56d of the first cam projection 56c may be set to a locking position and an unlocking position corresponding to a front-end 57d of a second cam projection 57c to be described later. In the locking position, the support 40 does not rotate with respect to the first body 20, and keeps a state folded on the first body 20 as in the first usage mode. When the front-end 56d of the first cam projection 56c is switched from the locking position (illustrated in FIG. 10) to the unlocking position (illustrated in FIG. 11), the support 40 is rotated to a predetermined angle with respect to the first body 20 by the elastic force of the second elastic member 54 and is spaced away from the first body 20.

The second cam member 57 is coupled to the hinge 51 in a fixed state. A second cam projection 57c is formed in the second cam member 57 toward a side facing the first cam member 56. As above described, the second cam projection 57c selectively adjusts a rotation operation of the support 40 with respect to the first body 20 together with the first cam member 56.

Further, a cam inclined plane 57e inclined toward the second cam member 57 from the front-end 57d thereof is formed in the second cam member 57. The cam inclined plane 57e may have a length corresponding to the range of an angle in which the support 40 rotates from the first body 20 as it moves between the second usage mode and the first usage mode.

As noted above, the second hinge units 60a and 60b have substantially the same structure as the first hinge units 50a and 50b, and therefore detailed description thereof is omitted. For ease of reference when detailing the differences between the first and second hinge units 50a, 50b, 60a, and 60b, the "first" and "second" elastic members (not illustrated) of the second hinge units 60a and 60b are referred to as "third" and "fourth" elastic members." Likewise, a "first" cam member (not illustrated) and a "second" cam member 67 (illustrated in FIG. 12) of the second hinge units are referred to as "third" and "fourth" cam members.

Figure 12:
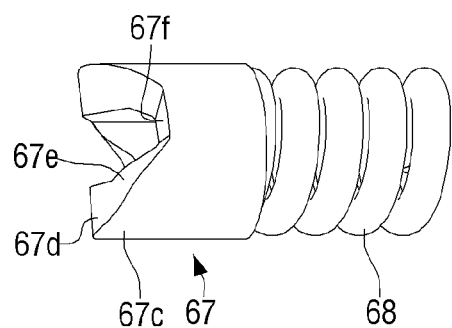
FIG. 12 is a view illustrating a second cam member and a second elastic member of a second hinge according to an exemplary embodiment of the present general inventive concept.

Referring to FIG. 12, the fourth cam member 67 of each of the pair of second hinge units 60a and 60b includes a fourth cam projection 67c, front-end 67d, and cam inclined plane 67e, similarly to the second cam member 57 of the first hinge units 50a and 50b. The fourth cam member 67 of the second hinge units 60a and 60b may further include a cam extended plane 67f, unlike the first hinge 50a. The cam extended plane 67f is formed without a slope unlike the cam inclined plane 67e. A length of the cam extended plane 67f may have a length corresponding to the range of an angle in which the second body 30 rotates as the usage mode is switched from the second usage mode (illustrated in FIG. 2) to the third usage mode (illustrated in FIG. 3).

The front-end 67d of the fourth cam member 67 is consistently pressed toward the third cam member (not illustrated) by the third elastic member 68. As a result of the pressed force, the second body 30 may be used in a state in which the second body 30 is inclined to a desired angle toward the keyboard while in the third usage mode (illustrated in FIG. 3) and also used in a state in which the second body 30 is turned to a predetermined angle in a direction opposite the keyboard 21 while in the fourth usage mode (illustrated in FIG. 7).

The first elastic member 58 may be a coil spring disposed at one side of the second cam member 57 to press the second cam member 57 toward the first cam member 56. At this time, since an elastic force (pressed force) of the first elastic member 58 is larger than an elastic force (torsion) of the second elastic member 54 in the above-described locking position, the first cam member 56 maintains the locking position.

One end of the first elastic member 58 may be disposed at one side of the second cam member 57, and the other end of the first elastic member 58 may be disposed at the adjustment nut 59. The adjustment nut 59 may be screw-connected to the fastener 51d, and may appropriately adjust the pressed force applied to the second cam member 57 from the first elastic member 58 through rotation movement towards or away from the first elastic member 58.

Figure 4:
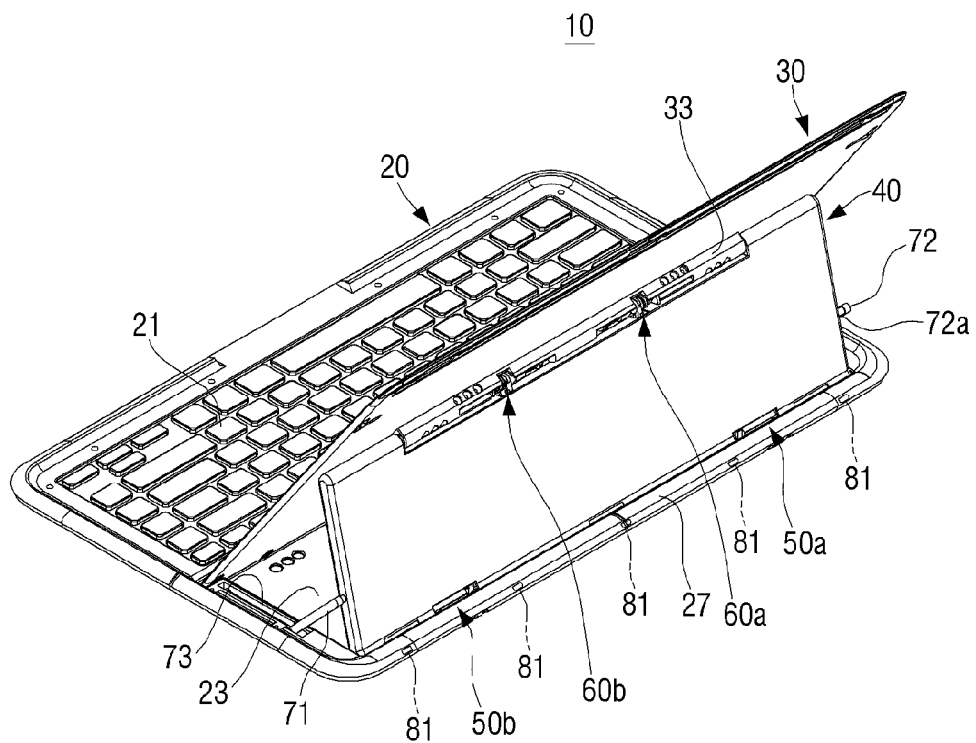
FIG. 4 is a perspective view of FIG. 3 in the direction IV illustrated in FIG. 3.

Referring to FIG. 4, two sides of the support 40 are supported by the first and second support rods 71 and 72. As the first and second support rods 71 and 72 solidly fix the support 40 in the second usage mode (illustrated in FIG. 2), the first and second support rods 71 and 72 may minimize swing of the second body 30 by touch force generated when the user touches the display 31 of the second body 30.

One end of each of the first and second support rods 71 and 72 is hinge-connected to the first body 20 and the other end thereof is hinge-connected to the support 40. Since the first and second support rods 71 and 72 have the same structure, only the first support rod 71 and a configuration of the first support rod 71 will be described.

Figure 13:
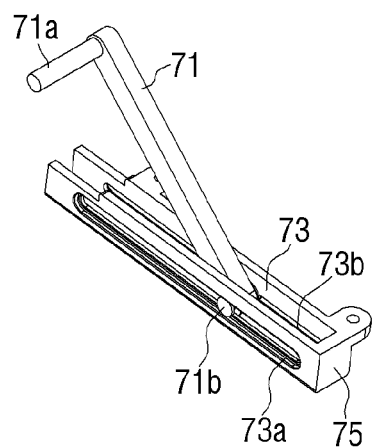
FIG. 13 is a perspective view illustrating a sliding structure of a first support rod according to an exemplary embodiment of the present general inventive concept.

The first support rod 71, illustrated in FIG. 13, has a predetermined length. A hinge projection 71a is formed to protrude in one end of the first support rod, and a hinge pin 71b penetrates to be coupled in the other end thereof. The hinge projection 71a is rotatably coupled to one end of the support 40. The hinge pin 71b protrudes from both sides of the other end of the first support rod 71 to be slidably coupled to guide rails 73a and 73b of the guide member 75 fixed to one end of the receiving groove 23 of the first body 20.

At this time, an inserting groove 73 into which the first support rod is inserted is formed in the guide member 75. Therefore, the first support rod 71 is inserted into the inserting groove 73 of the guide member 75 in the first usage mode, and the first rod 71 is withdrawn from the inserting groove 73 and simultaneously the hinge pin 71b slidably moves along the guide rails 73a and 73b when the usage mode is switched from the first usage mode to the second usage mode.

Figure 15:
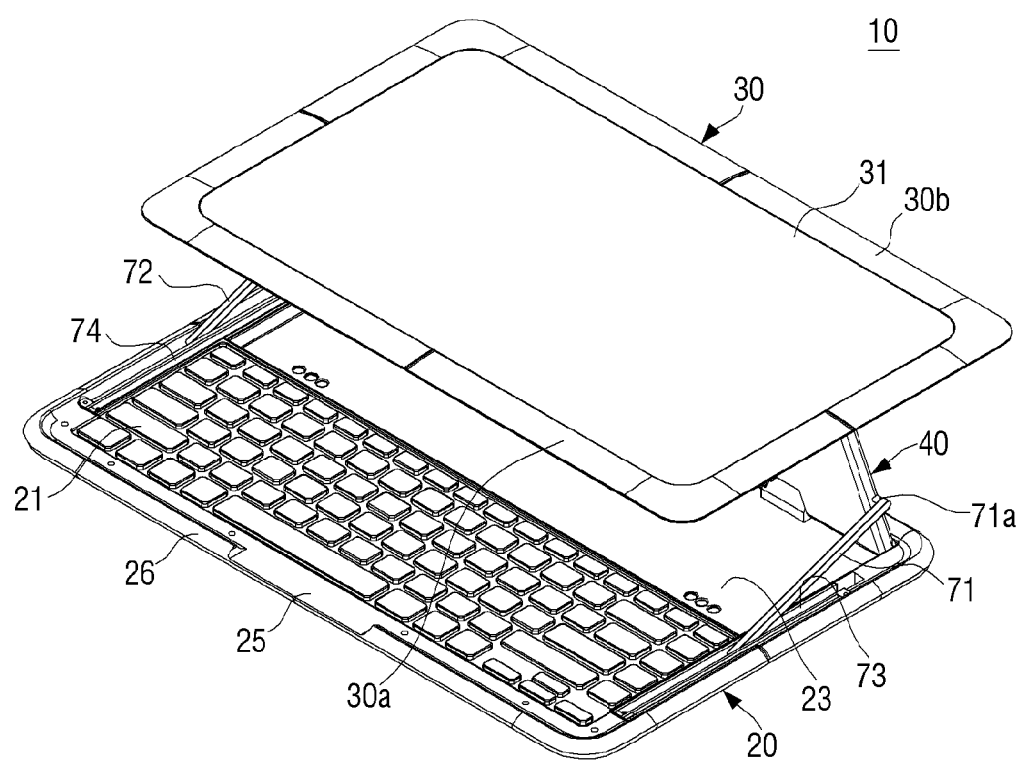
FIG. 15 is a view illustrating a convertible computer apparatus according another exemplary embodiment of the present general inventive concept.

In the above exemplary embodiment of the present general inventive concept, it has been described that the guide member 75 is configured as a part separated from the first body 20, but the present general inventive concept is not limited thereto, and the guide member 75 may be integrally formed with the first body 20. In FIG. 2, the reference numeral 74 denotes an inserting groove which the second support rod 72 is inserted into and withdrawn from, and in FIG. 4, the reference numeral 72a denotes a hinge projection of the second support rod 72. Furthermore, although the inserting grooves 73 and 74 are illustrated as extending up to the keyboard 21, it will be understood that, depending on the configuration of the embodiment of the present general inventive concept, specifically the length of support rods 71 and 72, these inserting grooves 73 and 74 may be extended alongside the keyboard 21 to accommodate the movement of the first and second support rods 71 and 72. This configuration corresponds to the exemplary embodiment of the present general inventive concept illustrated in FIG. 15.

As illustrated in FIG. 4, a plurality of first magnets 81 may be disposed at intervals inside the rear end portion 27 of the first body 20, and a plurality of second magnets 83 may be disposed inside the other end portion 30b of the second body 30. The arrangement of the pluralities of first and second magnets 81 and 83 may be set to correspond to each other in the fourth usage mode.

The pluralities of first and second magnets 81 and 83 may allow the rear end portion 27 of the first body 20 and the other end portion 30b of the second body 30 to be in contact with each other through mutual attractive magnetic force so that the first and second bodies 20 and 30 are held together while in the fourth usage mode (illustrated in FIG. 7). At this time, the magnetic force between the pluralities of first and second magnets 81 and 83 may be sufficient to overcome the elastic force of the first and second elastic members 58 and 54. Further, the first magnets 81 and the third magnets 83 may be disposed so that different magnets are located between the first magnets 81 and the third magnets 83 to generate mutual attraction in the fourth usage mode.

The convertible computing apparatus 10 according to an exemplary embodiment of the present general inventive concept having the above-described configuration may variously change locations and postures of the second body 30 and the support 40 to use any one usage mode among the first to fourth usage modes, as described below.

A process of switching the usage mode from the first usage mode to the second usage mode will be described with reference to FIGS. 1, 2, and 14. In the first usage mode (illustrated in FIG. 1), the front-end 56d of the first cam member 56 is set to a locking position with respect to the second cam member 57 (illustrated in FIG. 10), thereby holding the first body 20 parallel to the second body 30. When the user lifts up the end portion 30a of the second body 30, the end portion 30a of the second body is lifted up in a direction in which the second body 30 is spaced away from the first body 20, the support 40 rotating on the pair of first hinge units 50a and 50b as illustrated in FIG. 14.

Figure 11:
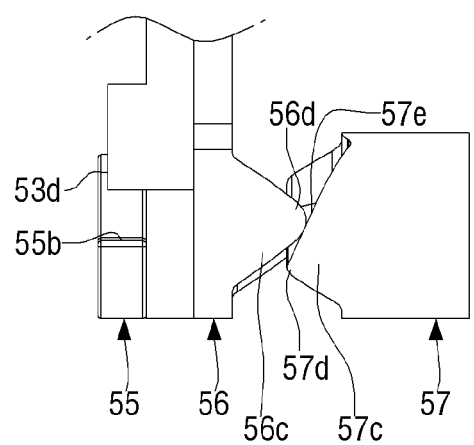
FIG. 11 is a view illustrating an unlocking state of a first hinge unit of a convertible computing apparatus according to an exemplary embodiment of the present general inventive concept.
Figure 14:
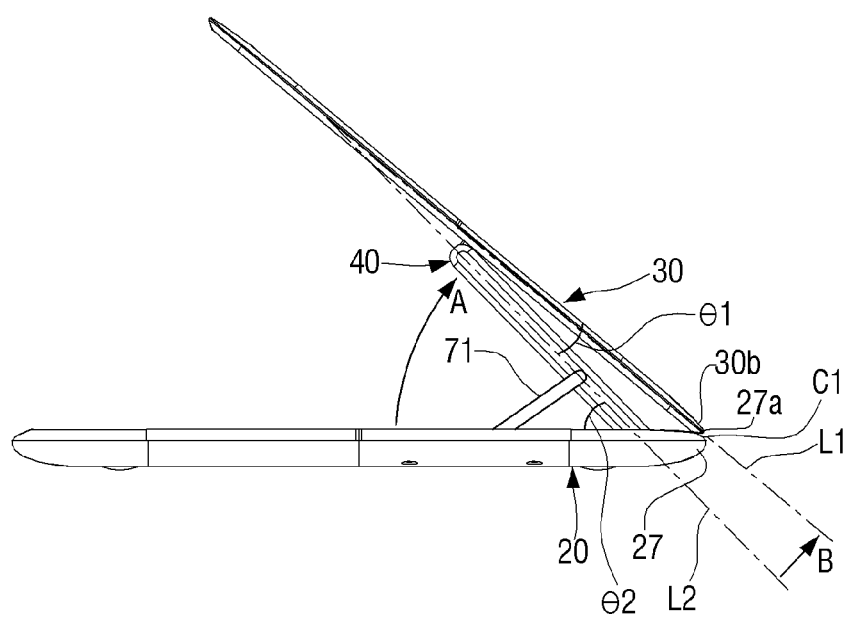
FIG. 14 is a view illustrating a state in which locking of a second hinge unit is released while a second body rotates to a B direction according to rotation of a support to an A direction according to an exemplary embodiment of the present general inventive concept.

Referring to FIG. 14, when the movement of the pair of first hinge units 50a and 50b causes the front-end of the second cam member 57 to move to the unlocking position (illustrated in FIG. 11), the support 40 rotates in the A direction (illustrated in FIG. 11). When the first cam member 57 is switched from the locking position is to the unlocking position, the support 40 rotates to a predetermined angle in the A direction illustrated in FIG. 14 according to the elastic force of the first elastic member 58, on the basis of the pair of first hinge units 50a and 50b, to a location corresponding to the second usage mode.

Further, as the support 40 rotates to the A direction, the second body 30 rotates to the A direction like the support 40, and simultaneously the other end portion 30b of the second body 30 is slidably guided toward an outer side 27a of the rear end portion 27 of the first body 20 along a top of the rear end portion 27 of the first body 20. This situation is illustrated in FIG. 14, illustrating a center axis L1 of the second body 30 forming a first angle θ1 with the center axis L2 of the support 40, while the center axis L2 of the support 40 forms a second angle θ2 with the first body 20. The second body 30 contacts the first body 20 at contact point C1. Thus, the second body 30 rotates to a predetermined angle to the B direction on the basis of the pair of second hinge units 60a and 60b, and the front end of the third cam member (not illustrated) of each of the pair of second hinge units 60a and 60b crosses the front end 67d of the fourth cam member 67 to move to the unlocking position. Therefore, the second body 30 is rotated by the elastic force of the fourth elastic member (not illustrated) of the second hinge units 60a and 60b to a predetermined angle on the basis of the pair of second hinge units 60a and 60b to a location corresponding to the second usage mode, to be disposed substantially parallel to the first body 20.

The rotation of the second body 30 in the B direction may occur just after the rotation to the A direction is performed, by interference of the other end portion 30b of the second body 30 with the end portion 27 of the first body 20, since the pair of first hinge units 50a and 50b may be spaced away from a periphery of the rear end portion of the first body 20 towards the inside of the first body 20, as illustrated for example in FIG. 3.

A first point of time in which the pair of hinge units 50a and 50b is in an unlocking state and the support 40 is rotatable with respect to the first body 20, and a second point of time in which the pair of second hinge units 60a and 60b are in a unlocking state, and the support 40 is rotatable with respect to the first body 20 will be sequentially described. Depending on the embodiment of the present general inventive concept, the first and second points of time may be approximately simultaneous. For the purposes of the present exemplary embodiment of the present general inventive concept, the first point of time occurs prior to the second point of time.

In a state in which the convertible computing apparatus 10 is switched into the second usage mode (illustrated in FIG. 2), the second body 30 maintains its orientation by the elastic force of the third elastic member 68 of each of the pair of second hinge units 60a and 60b. In this state, the user may set the convertible computer apparatus 10 to the third or fourth usage modes by rotating the second body 30 to a predetermined angle toward the keyboard 21 or rotating the second body 30 in a direction opposite the keyboard.

In the third usage mode (illustrated in FIG. 3), the second body 30 is rotated toward the keyboard 21 on the basis of the pair of second hinge units 60a and 60b and one end portion 30a of the second body 30 is placed in the receiving groove 23. At this time, twisting elastic force may be generated in the fourth elastic member (not illustrated) of each of the pair of second hinge units 60a and 60b, urging the second body 30 to the orientation of the second usage mode. However, since the elastic force of the fourth elastic member is less than that of the third elastic member 68, the second body 30 may maintain the orientation of the third usage mode.

In the fourth usage mode (illustrated in FIG. 7), the second body 30 is rotated toward a direction reverse to the direction the second body 30 is rotated in when switched to the third usage mode. At this time, the rear end portion 27 of the first body 20 is close to the other end portion 30b of the second body 30, attraction may act on the pluralities of first and second magnets 81 and 83 so that the rear end portion 27 of the first body 20 is in contact with the other end portion 30b of the second body 30. Therefore, the second body 30 maintains the orientation of the third usage mode.

Exemplary embodiments of the present general inventive concept are directed to a convertible computing apparatus 10, a display 31 of which may be moved to a plurality of angles, through a corresponding plurality of usage modes. Although exemplary embodiments of the present general inventive concept have been described above, it will be understood that the present general inventive concept is not limited to these exemplary embodiments. For example, although hinge units 50a, 50b, 60a, and 60b allowing the four usage modes illustrated in the Figures are described above, hinges allowing more or fewer usage modes may be used instead. Hinges which are held in place with friction, thereby allowing an infinite range of angles of the connector 40 and the second body 30 relative to the first body 20, may be used.

The second body 30 described above is similar in function and capability to a tablet PC. That is, it may be equipped with a touch screen to accept touch inputs, and may further include one or more imaging units, such as cameras, to capture images. Any suitable display screen may be used as the display 31 of the second body. For example, a flexible display would allow a user to bend the second body 30 into a desired shape. A two-sided display would allow the user to display images on either side of the second body, thereby allowing the user to share content without needing to change the second body 30 from the third usage mode to the fourth usage mode. A transparent display screen may also be implemented as the display 31. A transparent display screen, allowing a user to see objects through the display 31, would for example allow a user to use the keyboard 21 as a reference while typing on the display 31.

The first body 20 described above includes a keyboard 21, but is not limited just to this construction. Depending on the configuration of the convertible computing apparatus, the first body 20 may include other input devices such as a mouse, in addition to or instead of the keyboard 21. The first body 20 may also include access ports such as headphone jacks, Universal Serial Bus (USB) ports, memory card slots, and other such ports to allow peripheral devices such as headphones, printers, and so on to be attached to the convertible computing apparatus 10.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computing apparatus comprising:
a first body having a keyboard;
a second body having a display; and
a support having a first end portion and a second end portion, the first end portion being connected to the first body through at least one first hinge unit and the second end portion being connected to the second body through at least one second hinge unit disposed in parallel to the first hinge unit, the first hinge unit being disposed to be spaced away from a rear end portion of the first body so that when the second body and the support are simultaneously rotated in a direction in which the second body and the support are spaced away from the first body, a rear end portion of the second body interferes with the rear end portion of the first body and the second body is rotated in a direction in which the second body is spaced away from the support,
wherein opposing sides of the support are respectively supported by a first support rod and a second support rod, and one end of each of the first support rod and the second support rod are hinge-connected to the support and another end of thereof is slidably connected to the first body,
wherein the support further comprises:
a first guide member and a second guide member configured to allow the first support rod and the second support rod to be inserted and withdrawn thereto; and
a guide rail configured to allow the another end of each of the first support rod and the second support rod to be slidably guided along the first guide member and the second guide member are formed in each of the first guide member and the second guide member.

2. The computing apparatus of claim 1, wherein the at least one first hinge unit locks and unlocks the support with respect to the first body, and the at least one second hinge unit locks and unlocks the second body with respect to the support.

3. The computing apparatus of claim 2, wherein the at least one first hinge unit comprises:
a first hinge shaft;
a first cam member rotatably coupled to the first hinge shaft; and
a second cam member fixedly coupled to the first hinge shaft in a state of contacting, pressing, and supporting the first cam member.

4. The computing apparatus of claim 3, wherein the at least one first hinge unit further comprises a first elastic member configured to press the second cam member toward the first cam member so that the first cam member maintains a locking position with respect to the second cam member.

5. The computing apparatus of claim 4, wherein:
the first cam member comprises a first cam projection;
the second cam member comprises a second cam projection facing the first cam projection; and
when the first cam projection crosses a front end of the second cam projection in the locking position, the first cam projection is switched to an unlocking position.

6. The computing apparatus of claim 5, wherein the at least one first hinge unit further comprises a second elastic member configured to elastically support the first cam member to rotate the first cam member in an unlocking direction when the first cam projection is switched to the unlocking position.

7. The computing apparatus of claim 6, wherein the second elastic member comprises a torsion spring.

8. The computing apparatus of claim 3, wherein the at least one second hinge unit comprises:
a second hinge shaft;
a third cam member rotatably coupled to the second hinge shaft; and
a fourth cam member fixedly coupled to the second hinge shaft and in a state of contacting, pressing, and supporting the third cam member.

9. The computing apparatus of claim 8, wherein the at least one second hinge unit further comprises a third elastic member configured to press the fourth cam member toward the third cam member so that the third cam member maintains a locking position with respect to the fourth cam member.

10. The computing apparatus of claim 9, wherein:
the third cam member comprises a third cam projection;
the fourth cam member comprises a fourth cam projection facing the fourth third cam projection; and
when the third cam projection crosses a front end of the fourth cam projection in the locking position, the third cam projection is switched to an unlocking position.

11. The computing apparatus of claim 10, wherein the at least one second hinge unit further comprises a fourth elastic member configured to elastically support the third cam member to rotate the third cam member in an unlocking direction when the third cam projection is switched to the unlocking position.

12. The computing apparatus of claim 10, wherein the fourth cam member comprises a cam inclined plane configured to allow a front end of the third cam member to be guided while the support is spaced away from the first body to turn to a preset angle, and a cam extended plane configured to extend from the cam inclined surface plane and to allow the front end of the third cam member to be selectively located.

13. The computing apparatus of claim 12, wherein elastic force of the third elastic member is greater than that of the fourth elastic member so that a location of the front end of the third cam member is maintained at any point of the cam extended plane of the fourth cam member.

14. The computing apparatus of claim 13, wherein the third elastic member comprises a torsion spring.

15. The computing apparatus of claim 1, wherein the second body and the support are selectively set to a usage mode of one of a first usage mode in which the second body and the support are parallel to the first body, a second usage mode in which the support is rotated from the first body to be maintained at a preset angle to the first body, and the second body is rotated from the support to be maintained at a preset angle parallel to the first body, and a third usage mode in which the support is rotated from the first body to be maintained at a preset angle to the first body, and the second body is rotated to on the basis of the second hinge unit and maintained to be inclined toward the keyboard of the first body.

16. The computing apparatus of claim 15, wherein the second body and the support are selectively set to a fourth usage mode, in which the support is rotated from the first body to be maintained at a preset angle to the first body, and the second body is rotated on the basis of the second hinge unit, and maintained to be inclined toward a side of the first body opposite to a side of the first body in which the keyboard of the first body is located.

17. The computing apparatus of claim 16, wherein in the fourth usage mode, at least one first magnet is disposed in a rear end portion of the first body, and at least one second magnet configured to be attracted to the at least one first magnet and the at least one second magnet is disposed in a rear end portion of the second body adjacent to the rear end portion of the first body.

18. The computing apparatus of claim 15, wherein in the first usage mode, the second body is disposed in a location in which a periphery of the rear end portion of the second body is disposed at an inner side of a periphery of the rear end portion of the first body.

* * * * *